United States Patent
Nakagawa et al.

[11] Patent Number: 5,579,898
[45] Date of Patent: Dec. 3, 1996

[54] HEAT-RESISTING MATERIAL AND CONVEYER BELT USING SAME

[75] Inventors: Takao Nakagawa; Masaharu Tachibana, both of Urawa, Japan

[73] Assignee: Across Co., Ltd., Japan

[21] Appl. No.: 366,095

[22] Filed: Dec. 29, 1994

[30] Foreign Application Priority Data

Dec. 29, 1993 [JP] Japan .................................. 5-350263
Dec. 29, 1993 [JP] Japan .................................. 5-350264

[51] Int. Cl.$^6$ ............................ B65G 17/06; B32B 33/00
[52] U.S. Cl. ........................... 198/851; 428/408; 198/957
[58] Field of Search .................................. 198/851, 853, 198/DIG. 952, DIG. 957; 428/408, 469, 472, 698, 336

[56] References Cited

U.S. PATENT DOCUMENTS

| | | | |
|---|---|---|---|
| 2,778,480 | 1/1957 | Dobbins | 198/853 |
| 3,920,117 | 11/1975 | Roinestad | 198/853 |
| 4,252,856 | 2/1981 | Sara | 428/408 |
| 4,260,053 | 4/1981 | Onodera | 198/812 |
| 4,345,730 | 8/1982 | Leuvelink | 198/853 X |
| 4,346,138 | 8/1982 | Lefferts | 198/853 X |
| 4,618,056 | 10/1986 | Cutshall | 198/853 |
| 4,772,502 | 9/1988 | Okura et al. | 428/408 X |
| 5,330,046 | 7/1994 | Yuzawa et al. | 198/853 X |

FOREIGN PATENT DOCUMENTS

| | | |
|---|---|---|
| 0548864 | 6/1993 | European Pat. Off. . |
| 0566254 | 10/1993 | European Pat. Off. . |
| 2255820 | 7/1975 | France . |
| 1934230 | 1/1971 | Germany . |

Primary Examiner—David A. Bucci
Assistant Examiner—Scott L. Lowe
Attorney, Agent, or Firm—Lorusso & Loud

[57] ABSTRACT

A three-layer heat-resistant material is disclosed which includes a substrate of a carbon fiber-reinforced carbon composite, an outer metal layer and a ceramic layer interposed between the substrate and the metal layer. A conveyer belt using the heat-resistant material is also disclosed.

5 Claims, 2 Drawing Sheets

HEAT–RESISTING MATERIAL AND CONVEYER BELT USING SAME

BACKGROUND OF THE INVENTION

This invention relates generally to a heat-resistant material and, more specifically, to a three-layered material having a carbon fiber-reinforced carbon composite layer, a ceramic layer and a metal layer. The present invention is also directed to a belt conveyer using the heat-resistant material.

A heat-resistant alloy has been hitherto employed for a part which is subjected to high temperature conditions. One problem of such a heat-resistant alloy part is that a deformation thereof occurs upon repeated use due to thermal expansion and shrinkage. A carbon fiber reinforced carbon composite (hereinafter referred to as C-C composite) is now increasingly used in various fields because of good heat-resistance and high mechanical strength. One problem of such a C-C composite is that chemical deterioration occurs upon contact with steam, carbon dioxide or oxygen.

Thus, machines using the heat-resistant alloy or C-C composite as a part thereof which is subjected to a high temperature of, for example, 1,000° C., require repeated repair and maintenance works due to deterioration of the part.

SUMMARY OF THE INVENTION

It is, therefore, an object of the present invention to provide a novel heat-resistant material having an excellent resistance to heat and to gases such as steam, carbon dioxide and oxygen.

Another object of the present invention is to provide a heat-resistant material of the above-mentioned type which is useful for utilization as mechanical parts which are subjected to a high temperature.

It is a special object of the present invention to provide a conveyer belt having a long service life.

In accomplishing the foregoing object, there is provided in accordance with the present invention a heat-resistant material comprising a substrate of a carbon fiber-reinforced carbon composite, an intermediate layer of a ceramic provided over a surface of said substrate, and an outer layer of a metal provided over a surface of said intermediate layer, said intermediate and outer layers having thicknesses of 2–300 µm and 0.2–3 mm, respectively.

In another aspect, the present invention provides a conveyer belt comprising a plurality of parallel, laterally extending, spaced apart supporting rods, and link means formed of a metal and extending between each adjacent two of said supporting rods to link said adjacent two supporting rods, said link means being rotatably engaged by each of said adjacent two supporting rods, wherein each of said supporting rods is formed from the above heat-resistant material.

A composite material in which a C-C composite substrate is coated directly with a steel layer has been found to fail to accomplish the foregoing objects because the C-C composite reacts with the steel. It has been also found that a composite material in which a C-C composite substrate is coated with a ceramic layer fails to achieve the above objects because pin holes are formed in the ceramic layer upon subjected to high temperatures for a long period of time. It has now been found that when a C-C composite substrate is overlaid with a ceramic layer having a specific thickness and a metal layer having a specific thickness, the resulting composite material shows resistance to heat and gases for a long period of time.

BRIEF DESCRIPTION OF THE DRAWINGS

Other objects, features and advantages of the present invention will become apparent from the detailed description of the preferred embodiments of the invention which follows, when considered in light of the accompanying drawings, in which.

DETAILED DESCRIPTION OF THE PREFERRED EMBODIMENTS OF THE INVENTION

Figure 1:
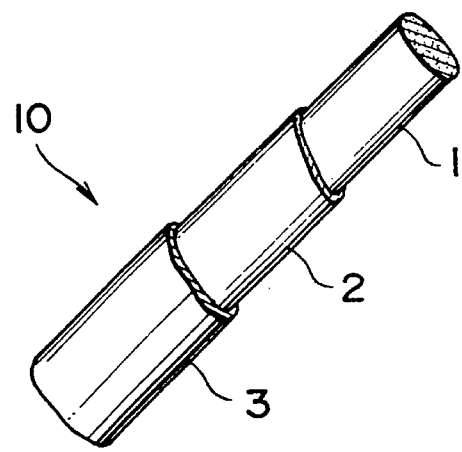
FIG. 1 is a perspective view, cut away in part, diagrammatically showing a heat-resistant material in the form of a rod according to the present invention.

Referring to FIG. 1, designated generally as 10 is a heat-resistant material according to the present invention. The material 10 is composed of a substrate 1 of a C-C composite in the form of a rod. The substrate 1 may be any other desired form such as a pipe, a plate or a block.

The C-C composite is a material in which a multiplicity of carbon fibers are dispersed in a carbonaceous matrix. A number of methods are known for the fabrication of C-C composites. Typical examples of such methods include (a) a CVD method wherein a hydrocarbon gas is fed to a furnace in which a carbon fiber preform is placed and heated at a high temperature, thereby to pyrolyze and carbonize the hydrocarbon gas and to permit the thus produced carbon to deposit on the carbon fiber preform, (b) a method wherein carbon fibers impregnated with a thermosetting resin such as a phenol resin or an epoxy resin is molded into a desired shape and the molding is then calcined in an inert gas to carbonize the resin and (c) a method which is disclosed in U.S. Pat. No. 4,772,502 and in which a preformed yarn, including a core of a multiplicity of carbon fibers into which mixed powder of carbonaceous pitch and coke is dispersed, and a flexible sleeve of a thermoplastic resin surrounding the core, is formed into a desired shape by hot pressing or filament winding and the shaped body is then calcined. Any known C-C composite may be suitably used for the purpose of the present invention.

Provided on a surface of the substrate 1 is an intermediate layer 2 of a ceramic having a thickness of 2–300 µm, preferably 5–100 µm. A thickness of the ceramic layer 2 of below 2 µm makes it difficult to prevent the reaction of the substrate with a metal layer 3 provided over the intermediate ceramic layer 2. Too large a thickness in excess of 300 µm is, on the other hand, undesirable because delamination of the ceramic layer is apt to occur upon being subjected to high temperature conditions.

Illustrative of suitable ceramics for the intermediate layer 2 are silicon carbide, titanium carbide, zirconium carbide, tungsten carbide, titanium nitride, zirconium nitride, aluminum nitride, boron nitride, silicon nitride, alumina, titania, chromia and silica.

The ceramic layer 2 may be formed on the substrate 1 by any suitable method such as a CVD (chemical vacuum deposition) method, a PVD (physical vacuum deposition) method, an ion plating method, a sputtering method, a thermal spraying method, a laser vacuum deposition method, a plasma spraying method, a plating method or a coating method.

The ceramic layer 2 is covered with the outer metal layer 3. The metal layer 3 is formed of a heat-resisting metal such as carbon steel, a steel alloy, e.g. stainless steel, molybdenum steel or nickel steel, a non-ferrous metal, e.g. aluminum, nickel or copper, or an alloy of a non-ferrous metal. The thickness of the metal layer 3 is 0.2–3 mm, preferably 0.4–2 mm. A thickness of the metal layer 3 of less than 0.2 mm is insufficient to provide satisfactory mechanical strength. When the thickness exceeds 3 mm, the resulting heat-resistant material 10 is apt to be deformed upon repeated use at high temperatures.

The metal layer 3 may be formed on the ceramic layer 2 by any suitable method such as a CVD method, a PVD method, an ion plating method, a sputtering method, a laser vacuum deposition method, a plasma spraying method or a plating method. When the substrate 1 is in the form of a relatively short rod, the metal layer 3 may be formed by inserting the substrate (core) 1 having the intermediate layer 2 into a previously prepared metal pipe which serves as the metal layer 3.

As a consequence of the above-described three-layered structure, the heat-resistant material 10 according to the present invention exhibits good heat resistance for a long period of time. In particular, the outer metal layer 3 can impart to the material 10 excellent resistance to gases such as $O_2$, CO, $CO_2$ and steam. The provision of the ceramic intermediate layer 2 can prevent the reaction between the C-C composite substrate 1 and the metal layer 3. Further, the C-C composite layer 1 can prevent the metal layer 3 from deforming during use. Moreover, even when pin holes are formed in the intermediate ceramic layer 2 during use, the metal layer 3 can protect the C-C composite substrate 1 from the attack by reactive gases. In addition, the heat-resistant material is light in weight and has a reduced heat capacity, contributing to the saving of energy consumption. The dimensional stability of the heat-resistant material permits the use thereof in an automated machine.

Figure 2:
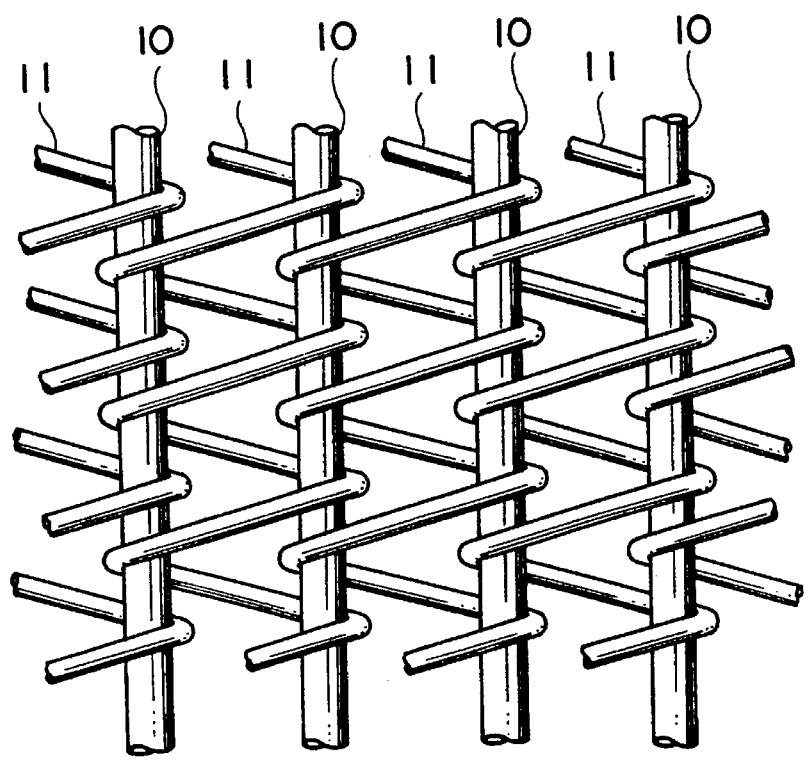
FIG. 2 is a fragmentary plan view schematically showing an embodiment of a conveyer belt using a heat-resistant rod of FIG. 1.

Thus, the heat-resistant material 10 according to the present invention lends itself to many applications such as jigs, heat rollers, conveyer belts and holders. FIG. 2 depicts one such application of the heat-resistant material 10 of the present invention.

The conveyer belt includes a plurality of parallel, laterally extending, spaced apart supporting rods 10, and link means 11 formed of a heat-resisting metal and extending between adjacent two of the supporting rods 10 to link the adjacent two supporting rods 10 such that each of the link means 11 is rotatable about respective supporting rods 10. Each of the supporting rods 10 is formed from a heat-resistant material according to the present invention.

Figure 3:
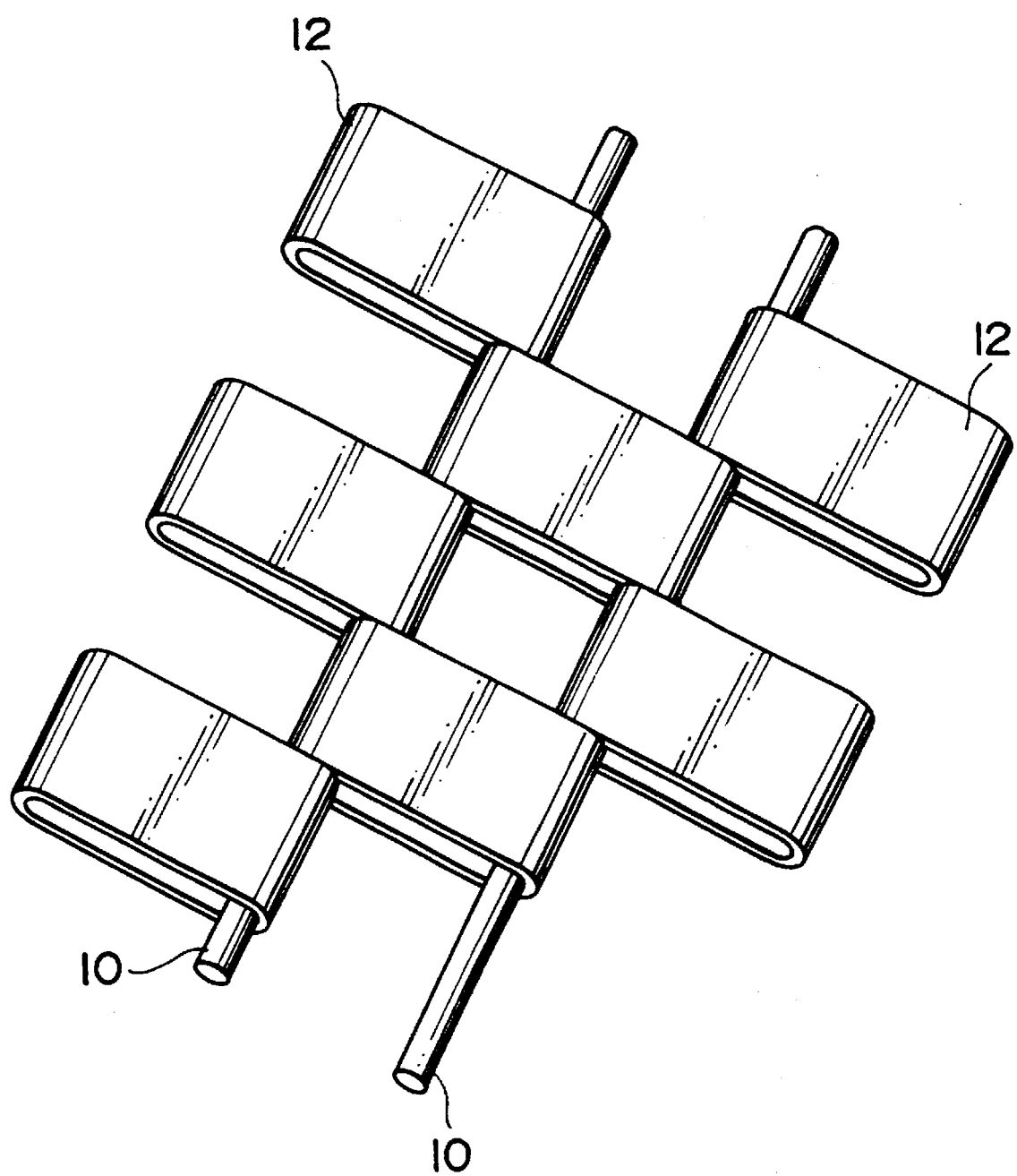
FIG. 3 is a fragmentary, perspective view schematically showing another embodiment of a conveyer belt of the present invention.

In the embodiment shown in FIG. 2, the link means 11 is a coil wound around adjacent two supporting rods 10. In the embodiment of FIG. 3, two adjacent supporting rods 10 are linked by a plurality of rings 12.

The following examples will further illustrate the present invention.

EXAMPLE 1

A multiplicity of C-C composite rods each having a diameter of 9 mm and a length of 600 mm were each coated with silicon carbide by powder coating method to form a 40 μm thick ceramic layer. The powder coating was performed by static coating of a powder coating composition containing silicon carbide powder and a phenol resin binder, followed by a heat treatment. Each of the coated rods was inserted into a SUS 304 stainless steel pipe having an outer diameter of 10.2 mm and a thickness of about 0.5 mm. After the insertion, both ends of each pipe were closed by welding. The rods were then formed into a cubic basket of a 600× 600×600 mm size by welding. A pair of metal parts were temporarily bonded with a solder paste and placed in the basket. The basket was then fed to a heat-treatment zone maintained at 1,160° C. and under a gas stream containing 2% of CO, 10% of $CO_2$, 2% of $H_2$ and 86% of $N_2$ and, subsequently, to a cooling zone so that the two metal parts were firmly bonded with each other. The above heating and cooling process including loading and unloading of the metal parts was carried out in an automatic mode. It was found that the basket was free of deformation and usable even after 1 year use.

Comparative Example 1

Example 1 was repeated in the same manner as described except that the basket used was formed from SUS 304 stainless steel rods (diameter: 10.2 mm, length: 600 mm). Deformation of the basket was so significant that the test was stopped about 1 month after the commencement of the test.

Comparative Example 2

Example 1 was repeated in the same manner as described except that the basket used was formed from C-C composite rods (diameter: 10.2 mm, length: 600 mm). Deterioration of the basket was so significant that the test was stopped about three weeks after the commencement of the test.

Comparative Example 3

Example 1 was repeated in the same manner as described except that the C-C composite rods were inserted into respective SUS 304 stainless steel pipe without coating with the silicon nitride ceramic. Deterioration of the basket due to the reaction of the metal layer with the C-C composite and to the reaction of the gases with the C-C composite was so significant that the test was stopped about 5 months after the commencement of the test.

EXAMPLE 2

A multiplicity of C-C composite rods each having a diameter of 5 mm, a length of 500 mm, a bending strength of 40 kgf/mm² and a density of 1.70 g/cm³ were each coated with alumina by thermal spraying method to form a 50 μm thick ceramic layer. Each of the coated rods was immersed in a nickel plating bath to form a nickel layer having a thickness of about 0.5 mm over the ceramic layer. Using the supporting rods thus obtained, an endless conveyer belt having a circumferential length of 40 m and a structure as shown in FIG. 2 was prepared. Each adjacent two supporting rods were linked with a coil formed of SUS 304 stainless steel and having a diameter of 4 mm. The space between each adjacent two supporting rods was 40 mm. The thus obtained conveyer belt was mounted on a conveyer disposed in an oven. The conveyer was driven at a running speed of 1 m per hour. The oven was maintained at 1,150° C. and in an atmosphere containing 1.5% of CO, 13% of $CO_2$, 1% of $H_2$ and 84.5% of $N_2$. It was found that the conveyer belt was free of deformation and usable even after 1 year use.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all the changes which come within the meaning and range of equivalency of the claims are therefore intended to be embraced therein.

We claim:

1. A heat-resistant material comprising a substrate of a carbon fiber-reinforced carbon composite, an intermediate layer of a ceramic provided over a surface of said substrate, and an outer layer of a metal provided over a surface of said intermediate layer, said intermediate and outer layers having thicknesses of 2–300 μm and 0.2–3 mm, respectively, wherein said ceramic is at least one member selected from the group consisting of silicon carbide, zirconium carbide, tungsten carbide, titanium nitride, zirconium nitride, aluminum nitride, boron nitride, silicon nitride, alumina, titania, chromia and silica.

2. A heat-resistant material as claimed in claim 1, wherein said metal is at least one member selected from the group consisting of steel, a steel alloy, aluminum, an aluminum alloy, copper, a copper alloy, nickel and a nickel alloy.

3. A heat-resistant material as claimed in claim 1, shaped in the form of one of a rod, a plate, a cylinder and a block.

4. A heat-resistant material as claimed in claim 1, wherein said substrate is in the form of a rod, wherein said intermediate layer surrounds said substrate, and wherein said outer layer surrounds said intermediate layer.

5. A conveyer belt comprising a plurality of parallel, laterally extending, spaced apart supporting rods, and link means formed of a metal and extending between each adjacent two of said supporting rods to link said adjacent two supporting rods, said link means being rotatably engaged by each of said adjacent two supporting rods, wherein each of said supporting rods is formed from a heat-resistant material comprising a substrate of a carbon fiber-reinforced carbon composite, an intermediate layer of a ceramic provided over a surface of said substrate, and an outer layer of a metal provided over a surface of said intermediate layer, said intermediate and outer layers having thicknesses of 2–300 μm and 0.2–3 mm, respectively, wherein said ceramic is at least one member selected from the group consisting of silicon carbide, zirconium carbide, tungsten carbide, titanium nitride, zirconium nitride, aluminum nitride, boron nitride, silicon nitride, alumina, titania, chromia and silica.

* * * * *